UNITED STATES PATENT OFFICE.

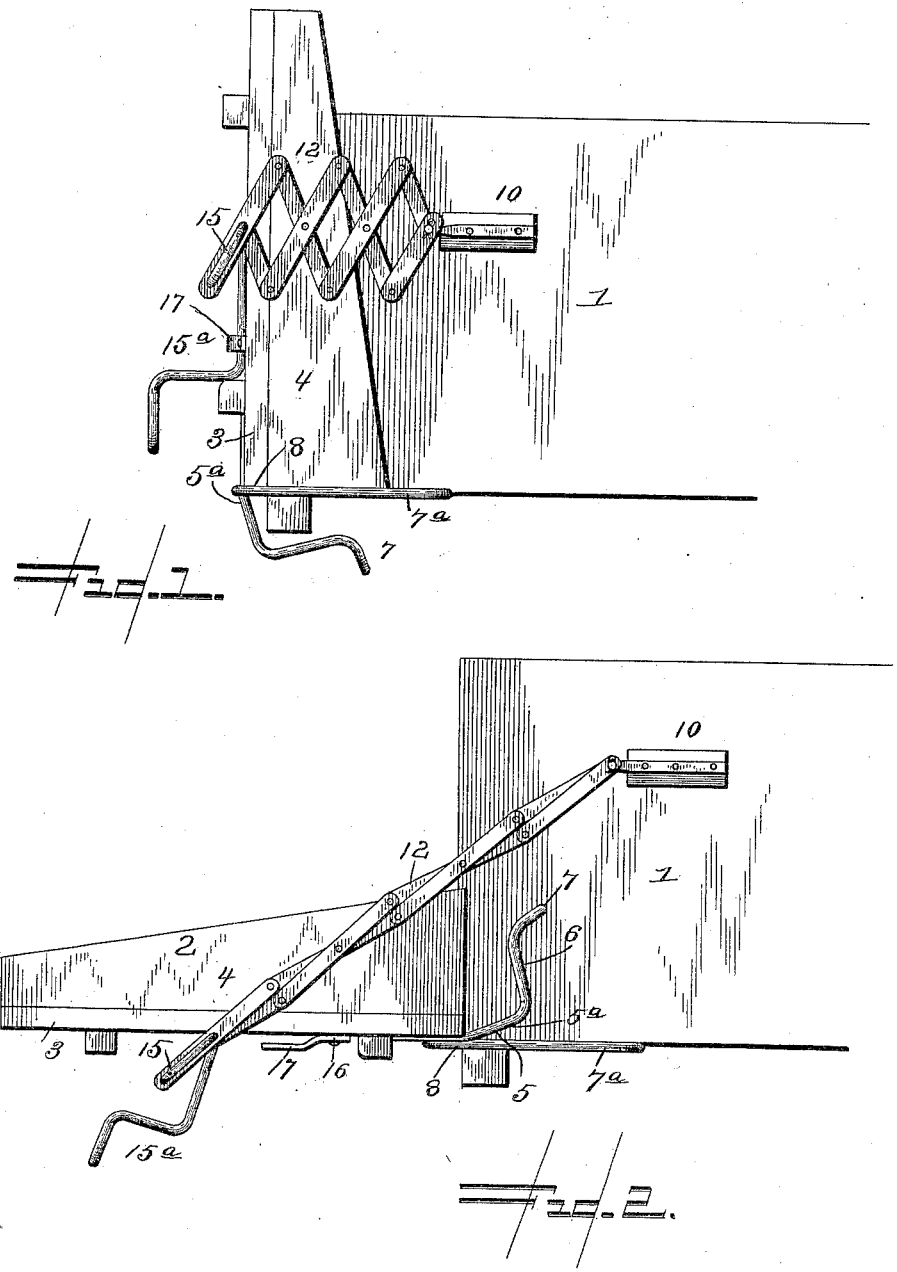

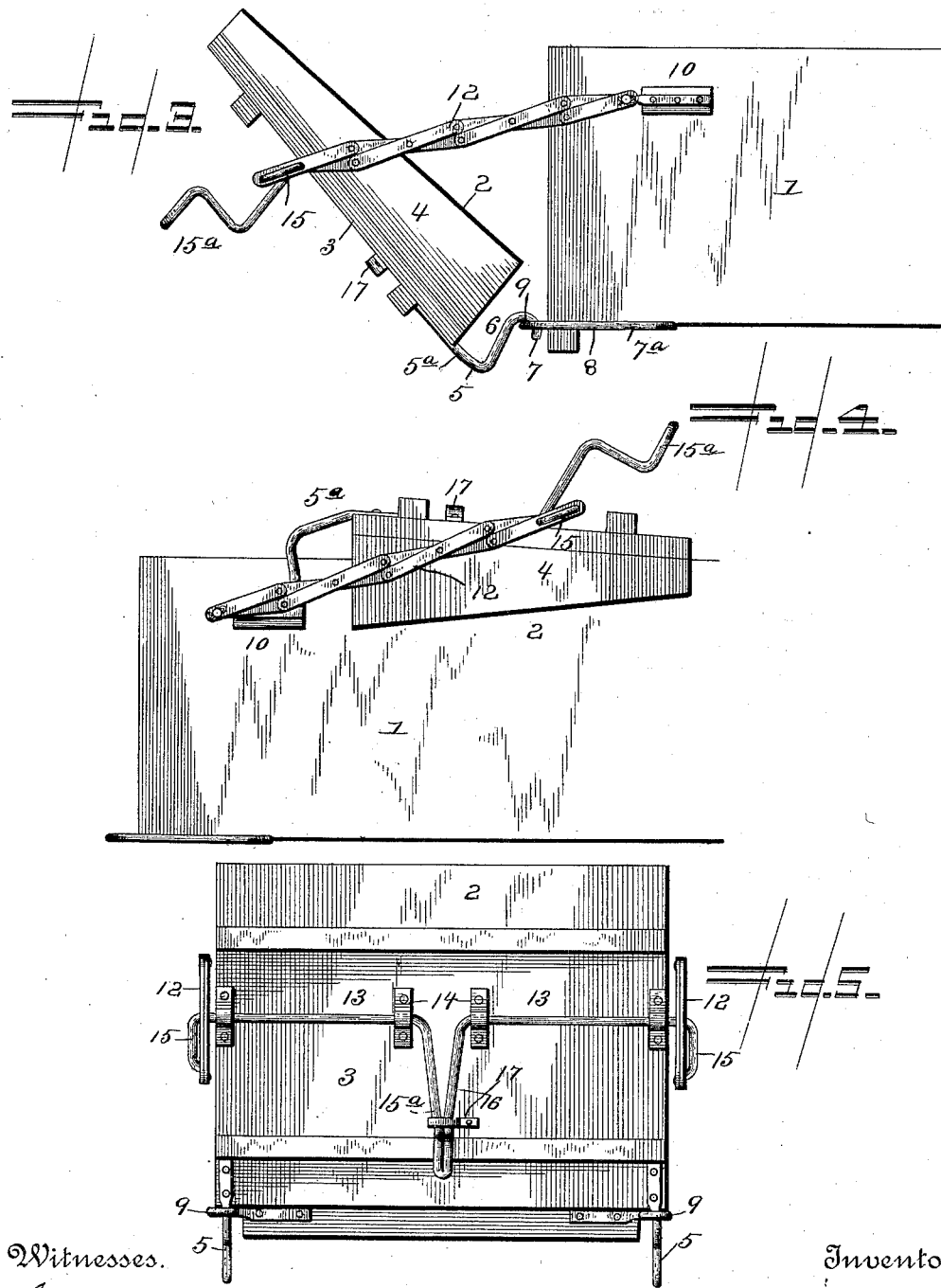

FRANK CYRUS RIDENOUR, OF ROSS, IOWA.

WAGON END-GATE.

SPECIFICATION forming part of Letters Patent No. 465,728, dated December 22, 1891.

Application filed July 11, 1891. Serial No. 399,175. (No model.)

*To all whom it may concern:*

Be it known that I, FRANK CYRUS RIDENOUR, a citizen of the United States, and a resident of Ross, in the county of Audubon and State of Iowa, have invented certain new and useful Improvements in End-Gates for Wagons; and I do hereby declare that the following is a full, clear, and exact description thereof, which will enable others skilled in the art to which it appertains to make and use the same, reference being had to the accompanying drawings, which form a part of this specification.

My invention relates to improvements in end-gates for wagons and other similar vehicles.

The object of the invention is to provide an improved construction of end-gate which, when in one position, will serve as a shoveling-board, whereby ear corn and other objects can be readily unloaded, and when in another position will allow small objects—such as shelled corn and other grain—to be dumped into an elevator or other place or receptacle. The gate can also be used as a seat support or board.

The invention consists in the novel construction and combination of parts hereinafter fully described, and definitely pointed out in the claims.

In the accompanying drawings, Figure 1 is a side elevation of a portion of a wagon with my improvement applied thereto, the gate being shown closed. Fig. 2 is a similar view showing the gate in position to be used as a shoveling-board. Fig. 3 is a similar view showing the same in position to allow the contents of the vehicle to be dumped. Fig. 4 is a similar view showing the gate employed as a seat support or board. Fig. 5 is an end view of the wagon.

In the said drawings, the reference-numeral 1 designates the wagon-body, constructed in any ordinary manner, and 2 the gate, consisting of the transverse portion 3, extending clear across the wagon-body, and the triangularly-shaped side pieces 4, which, when the gate is closed, embrace the rear ends of the sides of the wagon.

At each side of the gate, at the lower end thereof, is a rod $5^a$, which extends downwardly a short distance, forming an arm 5, then bent forwardly at right angles thereto, forming an arm 6, the end of which is bent downwardly, forming vertical arm 7, as seen in Fig. 1. These rods work in ways $7^a$ upon each side of the wagon-body, said ways being formed of metal rods which are secured at their forward ends near the rear of the said body, projecting outwardly a short distance. They are then extended rearwardly, forming longitudinal arms 8, which extend a short distance beyond the wagon-body, when they are bent into a loop 9 and their other ends secured to the end of the wagon.

Secured to a block 10, attached to the sides of the wagon-body near the upper rear ends, are the lazy-tongs 12, which consist of a number of metallic strips or bars, consisting of a system of connected levers which can be distended and contracted, as is well understood. Passing through the rearmost of these levers is a transverse bar 13, pivoted to the end-gate at 14 14, the outer ends of which are bent at right angles, forming arms 15, which are in turn bent inwardly and passed through apertures in the ends of one of said levers. At the center this bar 13 is bent downwardly and then outwardly and downwardly, forming an operating lever or handle $15^a$. Pivoted to the gate at 16 is a catch 17, which is adapted to engage with said lever and lock it in position when required.

To operate the gate so that it can be used as a shoveling-board, the catch 17 is disengaged from the lever $15^a$ and the latter pulled backwardly, when the gate will fall down and assume the position shown in Fig. 2, the lower or inner end resting upon the rear ends or loops of the ways $7^a$ and the upper or outer end being supported by the lazy-tongs, which will be distended for that purpose.

To operate the gate so that small grain and other articles can be dumped from the wagon, the catch is disengaged, as before stated. The gate is then raised until the vertical arms 5 of the rods $5^a$ slip out of the ways $7^a$, and is then pulled backward until the arms 7 of said rods engage with the loops 9, assuming the position shown in Fig. 3, with a space between the lower end of the gate and the wagon-body through which the contents of the wagon can escape.

To use the gate as a seat-support, it is raised up until the rods 5ª are entirely withdrawn from the ways, when it is shifted over upon the upper edges of the sides of the wagon-body, being prevented from lateral displacement by means of the triangular side pieces 4.

Having thus described my invention, what I claim is—

1. The combination, with a wagon-body having the ways at the lower rear end, of the end-gate having rods at the lower end, which work in said ways, said rods consisting of the downwardly-extending arms bent forwardly and then downwardly, forming horizontal and vertical arms, and the lazy-tongs connected with the gate and wagon-body, substantially as described.

2. The combination, with a wagon-body having ways at the lower rear end, said ways comprising the horizontal rods secured at their front ends to the wagon-body and projecting beyond the rear thereof, where they are bent into loops and fastened to the end of said body, of the end-gate provided with rods at its lower end, which work in said ways, said rods consisting of the downwardly-projecting portions and the horizontal and vertical portions, and the lazy-tongs connected with said gate and wagon-body, substantially as described.

3. The combination, with a wagon-body having at the lower rear end horizontal arms with loops at the outer ends, forming ways, of the end-gate having rods working in said ways, consisting of the downwardly-depending horizontal and vertical arms, the lazy-tongs connected with said end-gate and wagon-body, and the transverse rod pivoted to the end-gate, passing through the rear levers of the said lazy-tongs and having its ends bent at right angles and engaging with apertures in the free ends of one of said levers and bent at its center into an operating-lever, substantially as described.

In testimony that I claim the foregoing as my own I have hereunto affixed my signature in presence of two witnesses.

FRANK CYRUS RIDENOUR.

Witnesses:
GEORGE HALL STEMM,
JOHN A. RIDENOUR.